Figure 1:
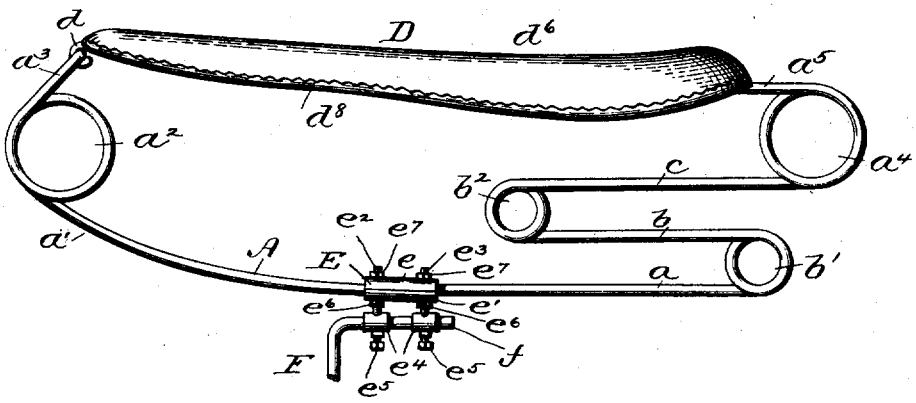

2 Sheets—Sheet 1.

R. S. TRUE.

Assignor, by mesne assignments, to THE R. S. TRUE COMPANY.

BICYCLE SADDLE.

No. 11,249. Reissued June 21, 1892.

Witnesses

W. J. Leidner.

B. W. Miller.

Inventor

Richard S. True.

By his Attorneys

Baldwin Davidson & Wright.

THE NORRIS PETERS CO., PHOTO-LITHO., WASHINGTON, D. C.

2 Sheets—Sheet 2.

R. S. TRUE.

Assignor, by mesne assignments, to THE R. S. TRUE COMPANY.

BICYCLE SADDLE.

No. 11,249. Reissued June 21, 1892.

Witnesses

W. J. Leidner

B. W. Miller

Inventor

Richard S. True.

By his Attorneys

Baldwin Wanderson & Wright

THE NORRIS PETERS CO., PHOTO-LITHO., WASHINGTON, D. C.

UNITED STATES PATENT OFFICE.

RICHARD S. TRUE, OF SYRACUSE, NEW YORK, ASSIGNOR, BY MESNE ASSIGNMENTS, TO THE R. S. TRUE COMPANY, OF SAME PLACE.

BICYCLE-SADDLE.

SPECIFICATION forming part of Reissued Letters Patent No. 11,249, dated June 21, 1892.

Original No. 455,027, dated June 30, 1891. Application for reissue filed April 5, 1892. Serial No. 427,944.

*To all whom it may concern:*

Be it known that I, RICHARD S. TRUE, of Syracuse, in the county of Onondaga and State of New York, have invented certain new and useful Improvements in Bicycles, of which the following, taken in connection with the accompanying drawings, is a full, clear, and exact description.

My invention more especially relates to improvements in the construction of bicycle-saddles, their supporting-springs, and their means of connection with each other and with the bicycle-frame itself, and has for its object the production of simple and effective devices whereby the jar or shock occasioned by the passage of the bicycle over rough or undulating surfaces is rendered practically or substantially imperceptible to the rider.

It also has for its object the production of improved devices whereby the various parts, while firmly connected, are readily adjustable relatively to each other.

To these ends my invention consists, essentially, first, in a saddle-supporting spring having a longitudinal central supporting portion or spring-bar and a pair of spring-arms connected therewith and extending from one extremity of the supporting-bar toward the opposite extremity and supporting a saddle at its extremities above said bar and spring-arms, whereby their tension equalizes and reduces jars or shocks to a minimum.

My invention consists, secondly, in an adjustable supporting-clip movable lengthwise on the above-mentioned supporting spring-bar, whereby the proportionate weight of the rider upon the opposite ends of the saddle-supporting spring may be varied at will to suit the convenience and weight of the rider.

My invention consists, thirdly, in certain novel details of construction and arrangement of the various parts, all as hereinafter more particularly described, and pointed out in the claims, whereby their connection, adjustment, and operation are facilitated.

In describing my invention reference is had to the accompanying drawings, forming a part of this specification, in which like letters and and figures indicate corresponding parts in all the views.

Figure 2:
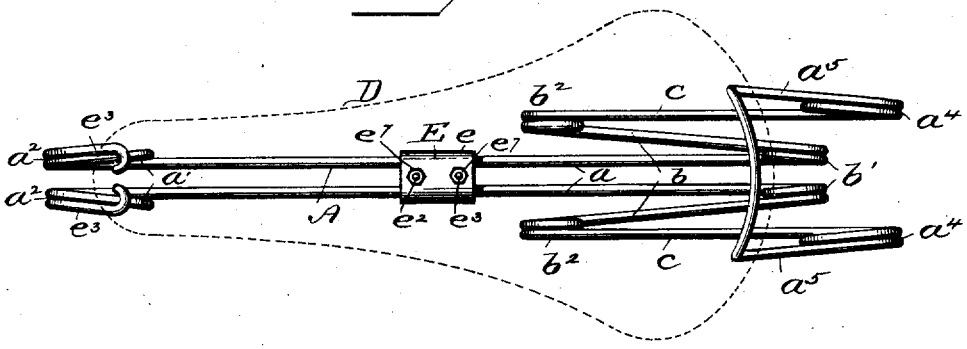
Figure 3:
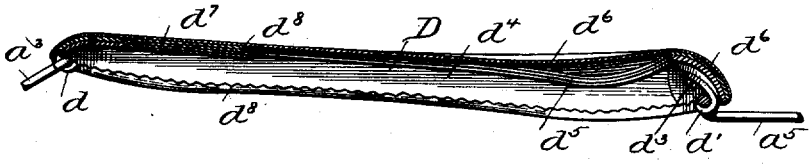
Figure 4:
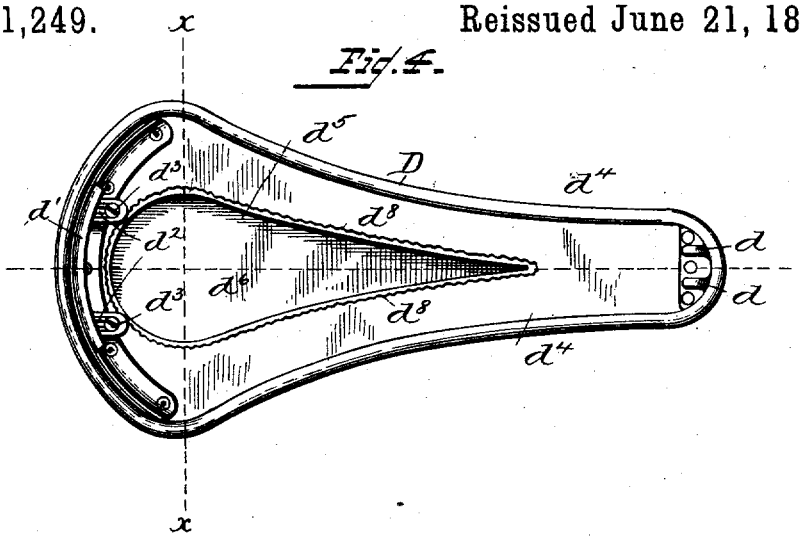
Figure 5:
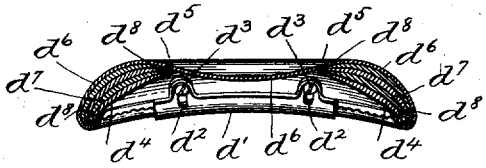
Figure 6:
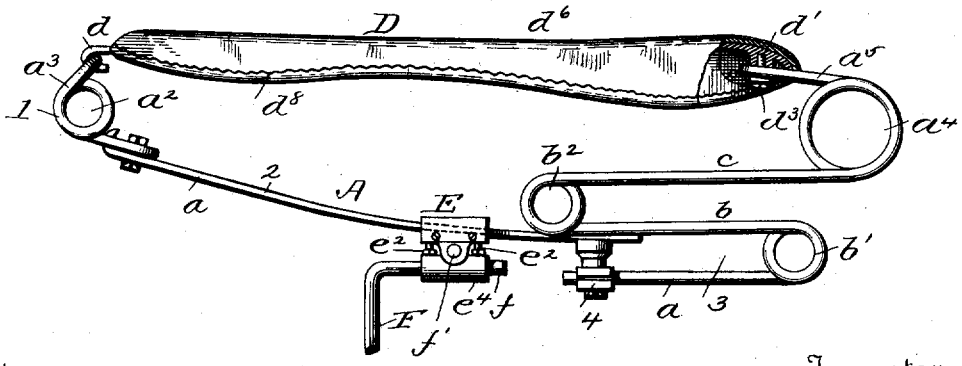

Figure 1 represents a view in elevation of the left-hand side of my improved bicycle-saddle, its springs, and supporting pin or bracket. Fig. 2 is a top plan view of the parts illustrated in Fig. 1, with the saddle removed to show the underlying parts, but indicated in outline by dotted lines. Fig. 3 shows a vertical central longitudinal section through the saddle. Fig. 4 is a plan view of the under side of the saddle detached from its supports. Fig. 5 is a vertical transverse sectional view thereof, taken on the line $x\ x$ of Fig. 4, looking backward; and Fig. 6 is a view in elevation like Fig. 1, showing a modification of my invention.

Unless otherwise indicated, the parts are of usual approved construction and operation.

Experience has demonstrated that the prime necessity of a thoroughly-efficient and easy-riding bicycle is a spring of such peculiar form and construction as to enable it to yield readily when the wheels pass over obstacles or a rough surface and readily to regain its normal position without perceptible jar or shock and consequent injurious effect upon the rider.

In the accompanying drawings, A represents my improved spring in its entirety, which spring consists of a longitudinal central portion or spring-bar $a$ and spring-arms $b\ c$, which extend from one extremity of this bar $a$ toward its opposite extremity. A coil $b'$ connects the adjacent extremities of the main supporting-bar $a$ and spring-arm $b$, and another coil $b^2$ connects the adjacent extremities of the spring-arms $b\ c$, above mentioned. The rear extremity of the spring A is also provided with a coil $a^4$. An arm or extremity $a^5$ of this upper rear coil $a^4$ engages a hooked plate or other suitable support $d'$, mounted upon the rear extremity of the saddle D and supporting that end of it. The forward extremity of the supporting-bar $a$ extends to a point preferably in advance of the saddle, and is formed into a coil $a^2$ upon the upwardly and rearwardly extending extremity $a^3$, of which the forward extremity of the saddle is supported by means of a hook or other support $d$ thereon, engaging with said upwardly-extending extremity $a^3$. It will thus be understood that the saddle is suspended between the opposite extremities of the spring A, which extends beneath the saddle, where it is reinforced by the spring-arms $b$ $c$, whereby a long and easy spring vibration is produced which renders the movements of the saddle particularly easy and convenient.

The coil $b^2$, it will be noted, occupies a point approximating the central portion of the saddle, the rear end of which saddle swings on this coil as a hinge-point, while this inner coil $b^2$ in turn swings on the outer lower rear coil $b'$ as another hinge-point, thus securing a long vibration or swing of the saddle with a minimum amount of jar thereof.

Upon reference to the drawings and to the foregoing description it will be noted that as the forward wheel rises or the rearward wheel falls (although these wheels and the frame of the bicycle are not shown in the drawings) the rear extremity of the saddle will rock or swing slightly backward on its supports and bring the entire spring into play, since when the rear extremity of the spring is tensioned its forward portion is slightly elevated, and thereby correspondingly tensioned. When, on the contrary, the forward wheel falls or the rearward wheel rises, the saddle rocks in an opposite direction; but, as previously set forth, in either movement of the saddle the spring-arms $b$ $c$ greatly add to the amount of vibration and cause the spring to be easy and gentle in its action. Indeed, experience has demonstrated that when riding over rough surfaces—as, for instance, sandstone or cobble-stone pavements—the spring is so easy and gentle in its action that all jar occasioned to the wheels is entirely overcome and the jar to the rider is practically or substantially imperceptible, rendering pleasureable a ride that would otherwise be very unpleasant and injurious.

In order to adjust the saddle for persons of different weight, I prefer to use a supporting-clip E upon the spring-bar $a$ and so to construct said clip that it may be movable lengthwise along this bar. This clip consists of separable halves or plates $e$ $e'$, clamped upon the spring-bar by suitable clamping devices or bolts $e^2$ $e^3$. As here illustrated, these bolts perform the double function of clamping together the separable divisions $e$ $e'$ of the spring plate or clip E and elevating or lowering the opposite extremities of said supporting-clip, in order to vary the altitude or inclination of the saddle. This clip E is preferably so constructed as to be readily mounted on the ordinary L-shaped pin or bracket F, upon which bicycle seats or saddles are usually supported. To facilitate this operation, the lower extremities of the bolts $e^2$ $e^3$ are provided with eyes $e^4$ and are held in the desired position by set-screws $e^5$, which bear against the longitudinally-extending arm $f$ of the supporting-bracket F. Upon the separate screw-bolts $e^2$ $e^3$ and beneath the lower plate $e'$ of the clip E are nuts $e^6$, which may either be screwed upward or downward to elevate or depress either or both of the extremities of the clip E, and thus vary its altitude or inclination, and consequently that of the saddle. It will be understood, however, that in the operation of the nuts $e^6$ it is also necessary to move the upper nuts $e^7$ in the same direction and to the same amount as the lower nuts $e^6$.

It will be understood that by the use of the clip E, which grasps the spring-bar, no weakening of the latter is occasioned, as would be the case if the adjusting-bolts passed directly therethrough. This adjustment of the spring in relation to the supporting-clip E is of great advantage with my particular construction of spring, since if the rider should be rather heavy the spring should be slid backward, in order to secure the ready and easy action of the spring-arms $b$ $c$, and, on the contrary, if the rider is light the spring should be moved forward in the clip, as otherwise the forward extremity of the spring would scarcely be brought into action.

In order to take up all slackness or loss of tension in the spring, the support $d'$ for the rear of the saddle is made adjustable lengthwise of the saddle, being provided for that purpose with slots $d^2$, Fig. 4, through which bolts $d^3$ pass for securing said support in its adjusted position.

As best seen in Fig. 2, the spring A is shown as composed of double or duplicate main supporting spring-bars $a$, spring-arms $b$ $c$, and coils $a^2$ $a^4$ $b'$ $b^2$. It is apparent, however, that, if desired, these parts may be constructed singly, as hereinbefore described, although the best results are produced when the spring is formed, as illustrated in Fig. 2, with its several parts duplicated.

It is evident that instead of forming the entire spring A of a continuous bar two or more separate pieces may be bent into the desired contour and secured together, so as to form my improved spring. This construction is shown in Fig. 6, in which the forward coil $a^2$ and its extremity $a^3$ are represented as composed of a short piece 1, the bar $a$ of a second piece 2, and the remaining portion of the spring of a Z-shaped bar 3, carrying the coils $b'$ $b^2$ $a^4$, and supported by a connection 4 upon the rear portion of the bar 2. This figure also shows the clip E as rocking on a central pivot $f'$ in its eye $e^4$, between which eye and the clip the adjusting bolts or screws $e^2$ are interposed. It also shows a modification of the connection of the spring-arm $a^5$ with the rear of the saddle, the supporting-plate being provided with a boss or stud, into which the bolt $d^3$ screws to firmly secure the arm $a^5$. My saddle D is also of peculiar construction, and is preferably composed of a lower strip $d^4$, of leather or other suitable material, having an opening $d^5$ in its center, and an upper strip $d^6$, which is preferably solid, or, in other words, unprovided with a central opening. By forming the strip $d^4$ with the opening $d^5$ it is made to be of less area than the upper strip $d^6$, and it extends inwardly from the edges of the saddle toward the center of the upper strip. Its opposite ends are secured to the front and rear ends of the upper strip, as well as to the sides thereof. Between these strips $d^4$ $d^6$ I interpose one or more filling-pieces $d^7$ and turn the outer lower edge of the strip $d^6$ downwardly and inwardly, whereby the edge of the saddle is made very strong and firm, and, owing to its downturned side edges, does not abrade or wear the rider's garments. Moreover, experience has demonstrated that in use this saddle slightly decreases in width, owing to the difference in thickness of its edges and central portion, and said central portion slightly collapses, thus preventing injury to the overlying glands and tender parts of the rider. These various divisions of the saddle are firmly secured together by stitching $d^8$, which extends along the outer edge of the saddle and the inner edge of the central opening in the strip $d^4$.

The operation of my improved bicycle will readily be understood from the foregoing description and upon reference to the drawings, and it will be understood that I do not limit myself to the precise form and construction of the parts hereinbefore set forth.

Having thus fully described my invention, what I claim as new, and desire to secure by Letters Patent, is—

1. The herein-described bicycle-saddle spring, comprising a central supporting portion $a$, having a coil $a^2$ at one extremity thereof, a coil $b'$ at its opposite extremity, a coil $a^4$, and spring-arms $b$ $c$, connecting this coil and the coil $b'$, substantially as and for the purpose described.

2. The herein-described bicycle-saddle spring, comprising a pair of central supporting portions $a$, having coils $a^2$ at their forward extremities and coils $b'$ at their opposite extremities, coils $a^4$, and spring-arms $b$ $c$, connecting these coils with the coils $b'$, substantially as and for the purpose described.

3. The herein-described bicycle-saddle spring, comprising a central supporting portion $a$, having a coil $a^2$ at one extremity thereof, a coil $b'$ at its opposite extremity, a coil $a^4$, spring-arms $b$ $c$, connecting coil $b'$ with coil $a^4$, and a coil $b^2$, connecting said spring-arms, substantially as and for the purpose described.

4. The herein-described bicycle-saddle spring, comprising a central spring-bar $a$, a coil $a^2$ at one extremity thereof, a pair of coils $a^4$ $b'$ at its opposite extremity, a pair of inwardly-extending spring-arms above the spring-bar $a$, and a coil $b^2$, connecting the adjacent extremities of the spring-arms, substantially as and for the purpose described.

5. The combination, with a bicycle-saddle, of a spring comprising a spring-bar $a$, coils $a^2$ $b'$, a coil $a^4$ above the coil $b'$, spring-arms $b$ $c$, extending from both the coils $b'$ $a^4$ toward the front, and a coil $b^2$, connecting the forward ends of the arms, substantially as and for the purpose described.

6. The combination, with a bicycle-saddle, of a spring having a coil $a^2$ in front and a coil $b'$ at the rear of the saddle, a second rear coil $a^4$ above the former rear coil, spring-arms $b$ $c$, extending from the rear end toward the front coil $a^2$, and a coil $b^2$ at the forward ends of said spring-arms, substantially as and for the purpose described.

7. The combination, with a saddle, of a supporting-spring, comprising a spring-bar $a$ and a pair of spring-arms $b$ $c$, of less length, extending from one extremity thereof toward the other and having a coil $b^2$ at their inner ends, substantially as and for the purpose described.

8. The combination, with a saddle, of a supporting-spring comprising a spring-bar $a$, coils $a^2$ $b'$ at the end thereof, and a pair of substantially parallel spring-arms $b$ $c$, of less length, above the spring-bar $a$ and extending from one extremity thereof toward the other, substantially as and for the purpose described.

9. The combination, with a saddle, of a supporting-spring comprising a pair of spring-bars $a$ and a pair of substantially parallel spring-arms $b$ $c$, of less length, extending from one extremity thereof toward the other and having coils $a^4$ $b'$ at their ends, substantially as and for the purpose described.

10. The combination, with a bicycle-saddle, of a supporting-spring comprising a spring-bar, a pair of substantially parallel spring-arms of less length above it, extending from one extremity thereof toward the other and having coils $a^4$ $b'$ at their ends, and a supporting-clip E, movable lengthwise on the bar, substantially as and for the purpose described.

11. The combination, with a bicycle-saddle, of a supporting-spring comprising a spring-bar $a$, a pair of substantially parallel spring-arms, of less length, extending from one extremity thereof toward the other and having coils $a^4$ $b'$ at their ends, a supporting-clip E, movable lengthwise on the bar, and a support F for the clip, substantially as and for the purpose described.

12. The combination, with a bicycle-saddle, of a supporting-spring comprising a spring-bar, a pair of spring-arms $b$ $c$, of less length, extending from one extremity thereof toward the other and arranged above it, a supporting-clip E, movable lengthwise on the bar $a$, a support F for the clip, and adjusting devices between the clip and support for varying the position or inclination of the clip and spring, substantially as and for the purpose described.

13. The combination, with a bicycle-saddle, of a supporting-spring comprising a spring-bar $a$, a pair of spring-arms $b$ $c$, of less length, extending from one extremity thereof toward the other above it, a supporting-clip E, comprising separable plates $e$ $e'$, grasping the spring-bar, bolts $e^2$ $e^3$, clamping said plates together, and nuts on said bolts raising or lowering the opposite extremities thereof, substantially as and for the purpose described.

14. The combination, with a support, of the herein-described bicycle-saddle having an upper strip $d^6$ and a lower strip $d^4$, the latter being of less area than the former and extending inwardly toward the center of the upper strip with its opposite ends secured to the front and rear ends of the former strip, substantially as and for the purpose described.

15. The combination, with a support, of the herein-described bicycle-saddle having an upper strip $d^6$ and a lower strip $d^4$, the latter having a central opening, and one or more filling-pieces $d^7$ between the adjacent surfaces of said strips, substantially as and for the purpose described.

In testimony whereof I have hereunto signed my name.

RICHARD S. TRUE.

Witnesses:
L. E. FELLOWS,
F. H. PRESCOTT.